United States Patent [19]
Smith

[11] 3,921,241
[45] Nov. 25, 1975

[54] DOCKBOARD SUPPORT

[75] Inventor: Vernon O. Smith, Ashley, Ohio

[73] Assignee: Overhead Door Corporation, Dallas, Tex.

[22] Filed: Apr. 8, 1974

[21] Appl. No.: 458,572

[52] U.S. Cl. ................................................. 14/71
[51] Int. Cl.² ........................................ B65G 11/00
[58] Field of Search .................................. 14/71, 72

[56] References Cited
UNITED STATES PATENTS

| | | | |
|---|---|---|---|
| 3,137,017 | 6/1964 | Pfleger | 14/71 |
| 3,167,796 | 2/1965 | Layne | 14/71 |
| 3,299,456 | 1/1967 | Dieter | 14/71 |
| 3,368,229 | 2/1968 | Pfleger | 14/71 |
| 3,530,488 | 9/1970 | Beckwith | 14/71 |
| 3,728,753 | 4/1973 | Beckwith | 14/71 |

*Primary Examiner*—Nile C. Byers, Jr.
*Attorney, Agent, or Firm*—Woodhams, Blanchard and Flynn

[57] ABSTRACT

A dock leveler having a ramp positioned for engagement with the floor of a truck and freely swingable through a selected angle, both above and below a horizontal position, to accommodate various floor heights. To prevent the ramp from falling more than a small distance, in the event a load is positioned on the ramp and the truck moves away from the ramp, improved cross traffic legs are positioned for coaction with an abutment secured to the dock. There are at least two legs pivotally supported beneath and near the front edge of the ramp for engagement, one at a time, with said abutment whereby the front edge of the ramp is supported at two different levels. Both legs can be moved by manually operable means into non-supporting positions so that said ramp can drop below said levels.

11 Claims, 4 Drawing Figures

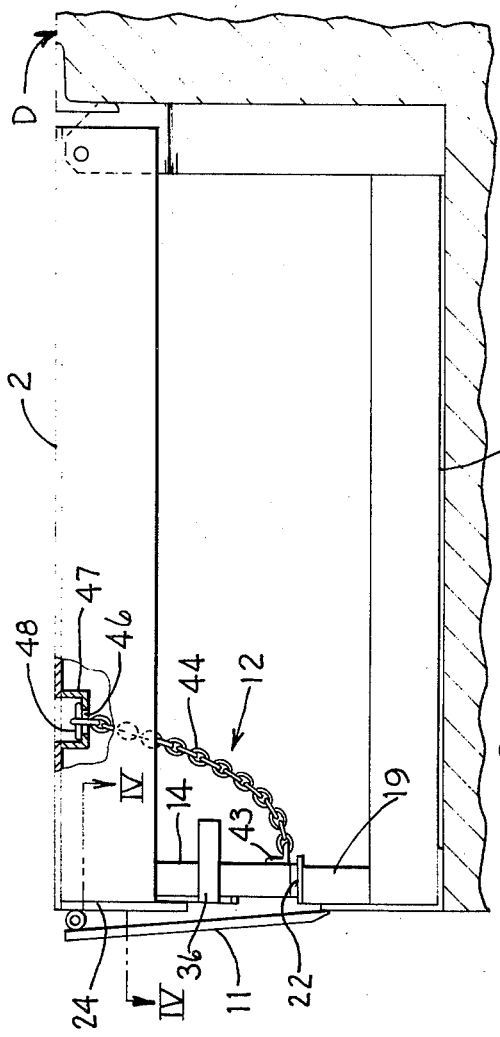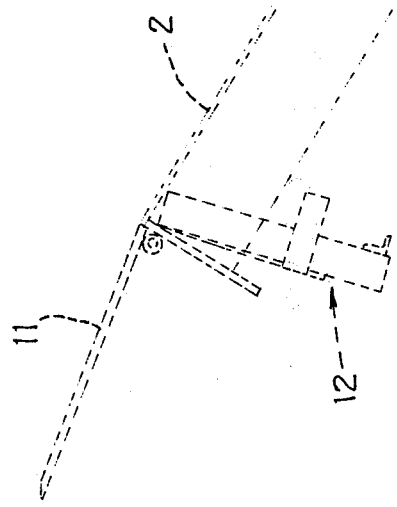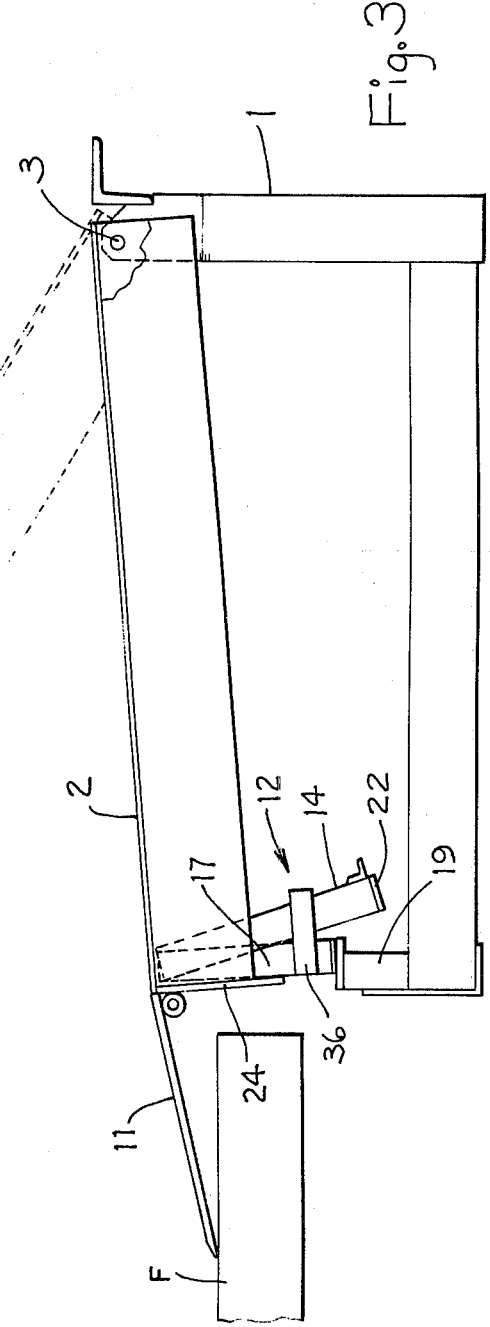

DOCKBOARD SUPPORT

FIELD OF THE INVENTION

This invention relates to a dock leveler and, more particularly, to improved cross traffic legs for preventing a loaded ramp dropping below selectable levels.

BACKGROUND OF THE INVENTION

Dock levelers or dockboards, as they are also called, are adapted for installation on loading docks to span the gap between the dock and the floor or bed of a truck or other carrier, which carrier is in position to be loaded or unloaded. Dockboards of this type have a ramp or deck which is hingedly mounted at its rear edge, the front edge of the deck having an extension lip, often hinged thereto, to rest upon the bed of the truck. The entire dock leveler is normally positioned within a shallow pit near the loading edge of the dock so that the rear hinged edge of the ramp is flush with the top of the dock, the ramp normally being maintained in a position flush with the dock when not in use. However, when in use, the ramp may be angularly inclined upwardly or downwardly relative to the dock to accommodate trucks of different bed heights.

To use the dockboard, the truck to be loaded or unloaded is backed into position adjacent the front of the dockboard, the rear edge of the bed being adjacent but slightly spaced from the dock by bumper pads. The hold-down device of the dockboard is then released so that the front edge of the ramp is raised upwardly, as by means of a spring mechanism. This upward swinging of the ramp also causes the extension lip to be raised, after it has cleared the rear end of the truck bed. With the ramp in its raised position, the operator then walks onto the ramp to lower it. Accordingly, the extension lip also moves downwardly into engagement with the bed, whereupon the lip and the front of the ramp are supported by the bed of the carrier. The ramp, with its extension lip, thus bridges the gap between the dock and the carrier bed, even though the carrier bed may be above or below the dock level. Hold-down means prevents the ramp from lifting off the carrier bed. However, said hold-down means is designed so that the front edge of the ramp can float up and down with the changing height of the carrier bed as the loading or unloading proceeds.

Dock levelers of the above-mentioned type have also been provided with an adjustable cross traffic support which holds the ramp in its flush position, when not in use with a truck, and which also prevents excessive downward movement of the ramp when same is loaded and suddenly unsupported by the truck. For example, since the ramp must freely float when disposed in engagement with the truck bed, it will suddenly and rapidly swing downwardly if it is heavily loaded, such as by a forklift, and the truck pulls away from the dock so as to remove its support of the ramp. This situation can cause serious injury to the operator of the forklift.

Another situation where potential injury and damage can result occurs when the ramp is not being utilized and is positioned substantially flush with the dock. If the ramp is not positively supported, a forklift or the like driven across the ramp can cause it to swing downwardly and result in a serious accident.

While known cross traffic supports have minimized the serious accidents resulting from improperly supported ramps, nevertheless said known devices have not proven totally satisfactory under all operating conditions. More specifically, many of the known supports are adversely affected by severe weather conditions which reduce the dependability of their operation. For example, they are subject to corrosion, icing, and other physical abuse which occurs to dock equipment due to the fact that same is generally positioned outside and is thus exposed to all of the changing environmental conditions. Further, dock equipment is heavily abused due to the nature of the loading and use of the same in conjunction with trucks. Further, many of the known ramp supports utilize springs for controlling their operation, and springs are readily susceptible to fatigue and breakage.

In an attempt to eliminate the disadvantages associated with mechanical ramp supports, hydraulic or pneumatic supports have been utilized. However, many of the known hydraulic or pneumatic supports have had complex circuitry often involving the use of pumps, motors, shuttle valves, check valves, and the like, requiring substantial maintenance. Furthermore, hydraulic and pneumatic systems are adversely affected by the extreme weather conditions and changes to which the dockboards are exposed in most parts of the United States.

Accordingly, it is an object of the present invention to provide an improved cross traffic support for the ramp of a dock leveler which overcomes the above-mentioned disadvantages. Particularly, it is an object of the present invention to provide:

1. A cross traffic support, as aforesaid, which is positive acting for holding the ramp in the flush or cross traffic position when a large load is imposed thereon, while at the same time the support will permit free upward movement of the deck when such is desired.

2. A cross traffic support, as aforesaid, which will positively limit the downward movement of the ramp, if a truck is moved away from the support thereof and no other stop device is present or operative.

3. A cross traffic support, as aforesaid, which is manually operable from above the ramp.

Other objects and purposes of the present invention will be apparent to persons acquainted with devices of this type on reading the following specification and inspecting the accompanying drawings.

SUMMARY OF THE INVENTION

The objects and purposes of the present invention are met by providing a dock leveler having a ramp or deck vertically swingably mounted on a base frame which is adapted to be positioned within a pit in a loading dock near the loading edge thereof. A spring mechanism coacts between the base frame and the ramp for normally urging same upwardly. A lip plate is hingedly mounted on the front edge of the ramp and is adapted for engagement with the bed or a carrier or truck. A safety stop device, coacting between the ramp and the base frame, may be provided to prevent sudden downward swinging movement of the ramp in situations where the ramp is in an unsupported or unlocked condition and has a rather large load disposed thereon. A hold-down device prevents undesired upward movement of the ramp, except to a limited, controlled extent. Manually operable cross traffic legs are mounted on the ramp for holding same in the cross traffic position and for limiting downward movement of the ramp at selected levels, particularly if the said safety stop device malfunctions.

BRIEF DESCRIPTION OF THE DRAWINGS

FIG. 2 is a side elevational view of the dock leveler illustrating the cross traffic position of the ramp.

FIG. 3 is a side elevational view of the dock leveler showing the ramp in other positions.

Figure 1:
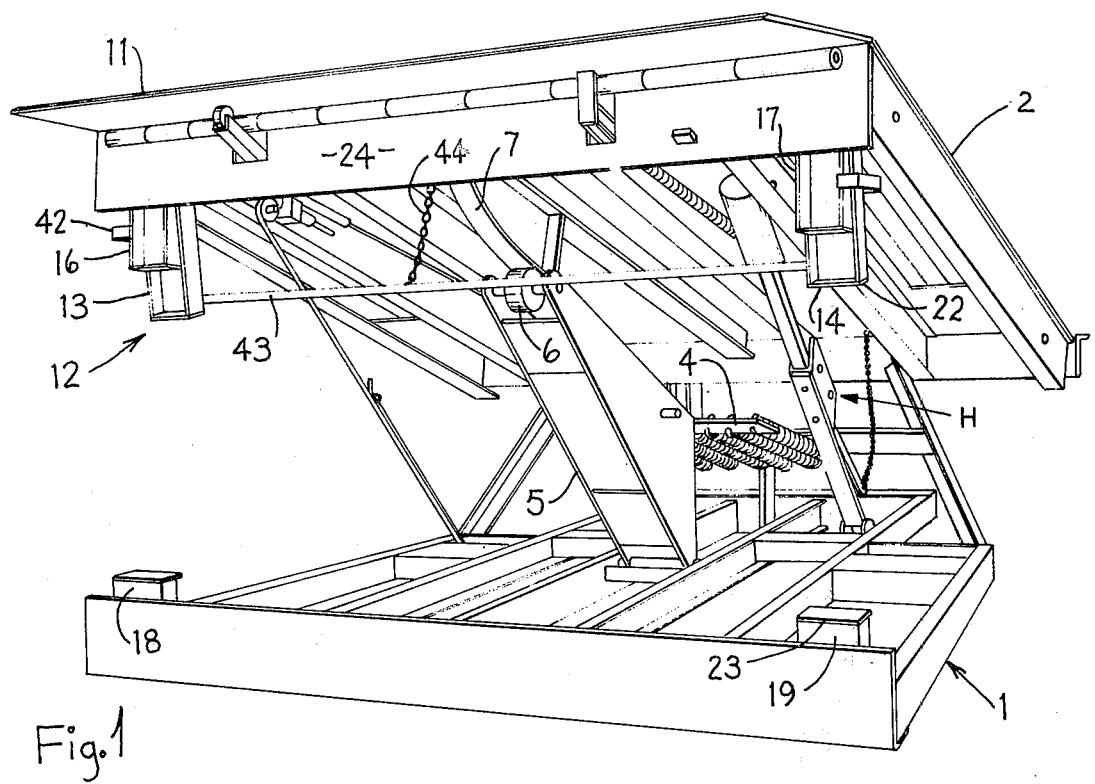
FIG. 1 is a perspective view of a dock leveler, same being illustrated in its raised position and incorporating the improved cross traffic legs of the invention.

For convenience in description, the words "right," "left," "up," "down," "front" and "rear" will have reference to the dock leveler and parts thereof as seen in FIG. 1 which exposes the front and right sides thereof. The words "inner" and "outer" will refer to the geometric center of the dockboard structure and designated parts thereof. Such terminology will include the words above specifically mentioned, derivatives thereof and words of similar import.

DETAILED DESCRIPTION

FIG. 1 illustrates an in-pit type dock leveler consisting of a rigid base frame 1 and a ramp or deck 2 which, adjacent its rear edge, is pivotally mounted on the base 1 by means of hinge pins 3. When in the cross traffic or inactive position (FIG. 2), the ramp 2 is normally maintained in a substantially horizontal position wherein it is substantially flush with the surrounding surface of the loading dock D. For this purpose, the dock leveler is provided with a releasable hold-down device H, of the type disclosed in U.S. Pat. application Ser. No. 394,736, filed Sept. 6, 1973, now U.S. Pat. No. 3,882,563 and assigned to the Assignee of this application. Said hold-down device restricts upward movement of the ramp from the horizontal position. However, the hold-down device is provided with means permitting limited upward and downward movement of the ramp as the truck floor changes height with the load thereof.

When the hold-down device H is released, the ramp 2 is normally urged upwardly by an extension spring mechanism 4 which has its rearward end affixed to the rear of the base frame 1 and its forward end affixed to the lift arm 5. The lift arm 5 has its lower end pivotally mounted on the base frame 1 and has a roller 6 affixed at its upper end and disposed in rolling engagement with cam 7 affixed to the underside of the ramp 2. The spring mechanism 4 thus resiliently urges the ramp 2 to swing upwardly (clockwise in FIG. 2) so that the ramp can assume the raised position illustrated in broken lines in FIG. 3. The force generated by the spring mechanism 4 is sufficient to support the ramp 2 in the raised position, but is not sufficient to overcome an additional 150 pound weight mounted on the ramp near the forward edge thereof. Thus, the ramp 2 can be walked down from its raised position to one of its lower positions, such as the solid line positions shown in FIGS. 2, 3 and 5, by a person of 150 pounds or more walking on the ramp from the rear to the front thereof.

The dock leveler is also provided in a conventional fashion with a lip plate 11 hinged to the forward edge of the ramp 2. The lip plate normally hangs downwardly in a pendent, gravity actuated position, substantially as illustrated in FIG. 2. The lip plate 11 is actuated to swing outwardly into the extended position of FIG. 3 when the ramp swings upwardly and approaches its raised position. The upward swinging movement of lip plate 11 can be effected by means such as that disclosed in W. O. Riggs U.S. Pat. No. 3 235 896.

As the dock leveler is walked down, lip 11 remains in its extended position for engagement with the floor of a truck. The structure of the dock leveler, as briefly described above, may be substantially conventional.

The cross traffic support 12 is comprised of two pairs of legs 13, 14 and 16, 17 (FIG. 1), engageable with the upper ends of similar abutments 18 and 19, which are secured to and extend upwardly from the base frame 1 near the front end thereof.

The ramp 2 has a front plate 24 rigidly secured to and extending downwardly from the front edge thereof. The front plate 24 is located so that its lower edge is engageable with the top plate 23 on the abutment 19.

In this embodiment, the short legs 16 and 17 hang downwardly about 3 inches lower than the front plate, and the long legs 13 and 14 hang about 3 inches lower than the short legs, as they appear in FIG. 2. This arrangement accommodates truck floor heights which vary 12 inches from lowest to highest.

Figure 4:
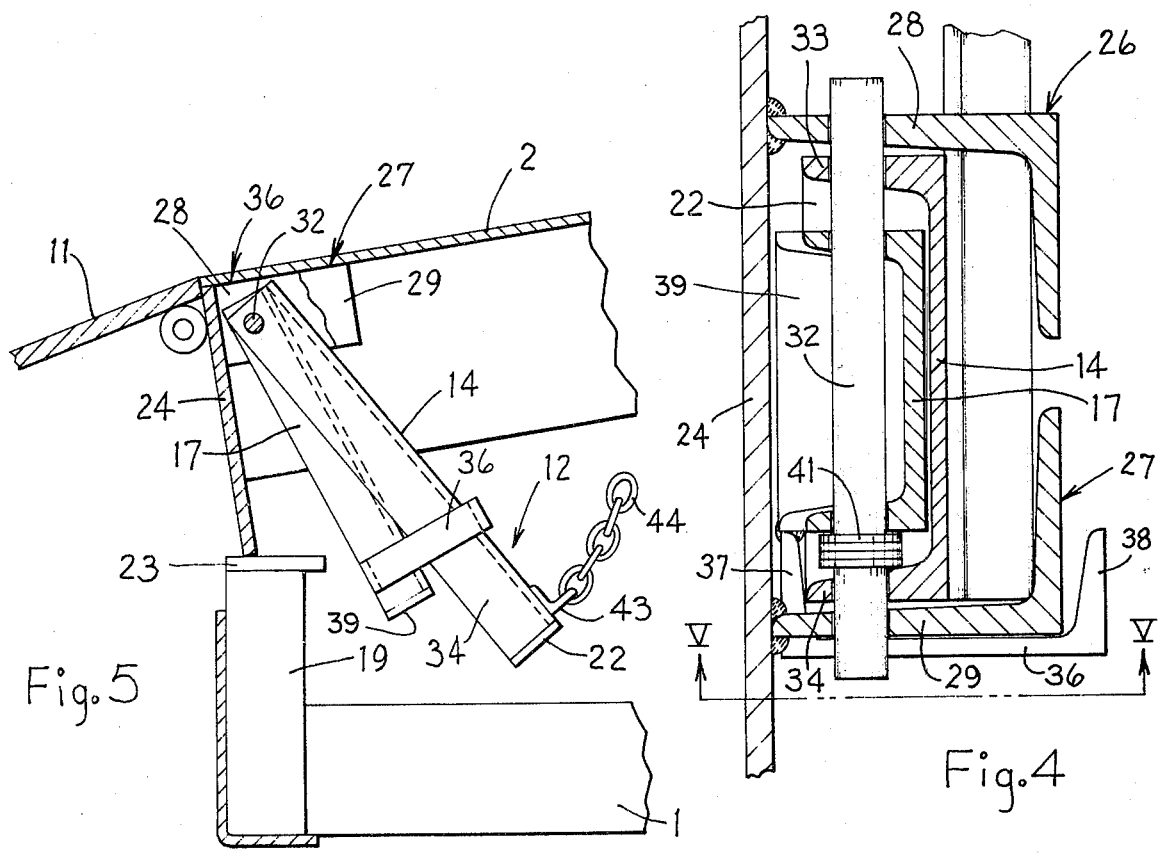
FIG. 4 is an enlarged, fragmentary sectional view taken substantially along the line IV—IV in FIG. 2.

A pair of spaced angles 26 and 27 are secured to the rear side of the front plate 24 and the lower side of the ramp 2. The long leg 14 (FIGS. 4 and 5) is formed from a piece of channel having a foot plate 22, which is engageable with the top plate 23 on the abutment 19. The angles 26 and 27 have parallel flanges 28 and 29 between which the upper end of the leg 14 is disposed. A pivot rod 32 extends through aligned openings in the flanges 28, 29 and through the flanges 33, 34 of the leg 14. Thus, the leg can swing between a supporting position shown in FIG. 2 and a nonsupporting position shown in FIGS. 3 and 5. The angles 26 and 27 limit rearward movement of the leg 14.

The short leg 17 is also a piece of channel which is nested within and is shorter than the long leg 14. The leg 17 is pivotally supported upon the rod 32 for movement between a supporting position shown in FIG. 3 in solid lines and a nonsupporting position shown in FIG. 5.

The pivot rod 32 is preferably located somewhat forwardly of the vertical center line of the leg 14 so that legs 14 and 17 will always tend, due to the urging of gravity, to bear against the front plate 24 when said ramp 2 is in or near to its cross traffic position of FIG. 2.

A channel-shaped connector 36 (FIG. 4) has one flange 37 thereof rigidly secured to the short leg 17 on the front side of leg 14. The other flange 38 is disposed on the rear side of leg 14. Thus, when the leg 14 is swung rearwardly (FIG. 5), it engages the flange 38 thereby moving the leg 17 rearwardly with it.

The short leg 17 has a foot plate 39 engageable with the top plate 23 of the abutment 19 (FIG. 3) for supporting the ramp 2 below its cross traffic position.

A spacer 41 is mounted on rod 32 between the flange 34 of leg 14 and the adjacent side of leg 17. The spacer 41 and connector 36 keep the legs 14 and 17 in their nested relationship.

The legs 13 and 16 are substantially and preferably identical with the legs 14 and 17, respectively, except that channel-shaped connector 42 is on the opposite side of the legs 13 and 16. The lower ends of the legs 13 and 16 are engageable, one at a time, with the upper end of the abutment 18 at the same time that the corresponding legs 14 and 17 are engageable with abutment

19.

Figure 5:
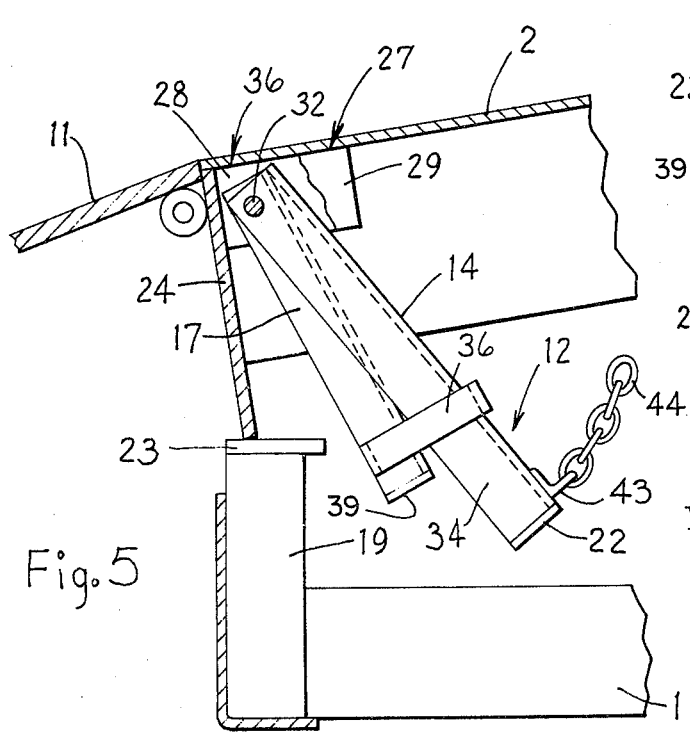
FIG. 5 is a cross sectional view substantially as taken along the line V—V in FIG. 4.

A cross bar 43 (FIG. 1) is rigidly secured, as by welding, near its opposite ends to the rear sides of the long legs 13 and 14 near their lower ends. A flexible element, such as a chain 44, is secured at one end to said cross bar 43 near its center. The other end of said chain extends through an opening 46 in the ramp 2. Specifically, the ramp 2 has a recessed wall portion 47 which has the opening 46 through which the chain 44 passes. The upper end of said chain 44 is connected to a ring 48 which is larger than said opening 46 and can be manually grasped for the purpose of pulling the chain upwardly through said opening 46 and thereby pivoting first the long legs and then the short legs rearwardly, as shown in FIGS. 3 and 5.

OPERATION

Although the operation of the invention will be apparent to persons skilled in the art from the foregoing description, a brief summary thereof follows.

With dock leveler properly installed in a pit, the normal inactive position of the ramp will be horizontal as shown in FIG. 2. When a truck is moved into loading or unloading position adjacent the dock D, the lip plate 11 will normally be in its pendent position. The operator will release any ramp latching means, such as a hold-down device H, so that the spring mechanism 4 can cause the lift arms to raise the ramp to a position as shown in broken lines in FIG. 3. During such raising, the lip plate 11 is swung upwardly by means such as that disclosed in said U.S. Pat. No. 3 235 896, so that said lip plate is above and at least partially over the rear edge of the truck floor F (FIG. 3).

The operator now walks onto the ramp 2, grasps the ring 48 and pulls the chain as far as he can so that the legs 13, 14, 16 and 17 are moved into the positions shown by legs 14 and 17 in FIG. 5. The operator then continues to walk toward the front edge of the ramp 2 so that his weight causes the ramp to move downwardly until the lip plate 11 engages the floor F of the truck. The hold-down device H will keep the ramp in this lowered position until it is released, subject to a controlled amount of permitted vertical movement as the floor F moves upwardly or downwardly with changes in the load.

The operator now releases the chain 44 so that the legs can swing back under gravity toward their positions of FIG. 2. If the ramp is above its cross traffic position, due to a relatively high truck floor, then the long legs 13 and 14 (FIG. 1) will be in their positions of alignment with the abutments 18 and 19, respectively. Thus, if the truck should pull away from the dock, the ramp will drop, usually no more than 3 or 4 inches, whereupon the legs 13 and 14 will engage said abutments and the ramp will stop in its cross-traffic position. If the ramp is slightly below its cross traffic level, then the long legs 13 and 14 will bear against the rear sides of the abutments 18 and 19, and the short legs 16 and 17 will be aligned with said abutments. Thus, if the truck pulls away, the ramp will drop no more than 3 inches and will stop as the short legs engage the abutments.

Finally, if the ramp is initially substantially below cross traffic position, the legs 13, 14 and 16, 17 may all be bearing against the rear sides of the abutments 18, 19. In that case, the front plate 24 on the ramp 2 will engage the abutments, if the truck pulls away, before the ramp can drop more than 3 inches.

When the loading and unloading operation is completed, the operator clears the ramp 2 and the truck pulls away from the dock. If the ramp is above the cross traffic position of FIG. 2, the lip plate 11 will automatically drop into its pendent position of FIG. 2. Now the operator walks the ramp down to its cross traffic position where it is automatically stopped by engagement of the long legs 13 and 14 with the abutments 18 and 19. The ramp 2 will then be held in the cross traffic position by the hold-down device H until used again.

There are situations where the lip plate 11 cannot be supported by the rear edge of the truck floor, as where the load is resting on such rear edge. Often, under these circumstances, the truck floor is below the dock level. The legs 13 and 14, the legs 16 and 17 and the front plate 24 provide three levels at which the ramp will be safely and positively supported during the removal of such end loads.

If, however, the ramp 2 is below its cross traffic position when the operation is completed, then the hold-down device must be released so that the ramp can swing upwardly slightly above the cross traffic position. The lip plate 11 will automatically drop, as will the legs 13, 14 and 16, 17 into their pendent positions. Thus, when the ramp is again walked down, it will return to and remain in its cross traffic position.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a dock leveler having support means, ramp means pivotally connected to said support means for pivotal movement between raised and lowered position, said ramp means being pivotal about a pivot axis adjacent the rear edge thereof, said ramp means having the front edge adapted for engagement with the floor of a carrier disposed in a loading or unloading position adjacent a dock, the combination comprising:

safety stop means coacting between said ramp means and said support means for preventing said ramp means for pivoting downwardly below a plurality of selected predetermined positions, said stop means including abutment means mounted on said support means and positioned under the front edge of said ramp means;

said stop means including first elongated leg means pivotally supported on said ramp means beneath and near the front edge of said ramp means for swinging movement about a horizontal axis between a first position engageable with said abutment means, whereby the front edge of said ramp means is supported at a first level, and a second position spaced laterally from said abutment means for permitting said ramp means to swingably move downwardly from said first level;

said stop means also including second elongated leg means pivotally supported on said ramp means beneath and near the front edge of said ramp means for swinging movement about a horizontal axis between a first position engageable with said abutment means, when said first leg means is in its second position, whereby the front edge of the ramp means is supported at a second level below said first level, and a second position spaced laterally from said abutment means for permitting downward swinging movement of said ramp means below said second level;

said first and second leg means each having their upper end portions pivotally connected to said ramp means so that said first and second leg means are each suspended downwardly below said ramp means and are biased solely by gravity toward their respective first positions; and actuating means connected to said first and second leg means and operable for individually and selectively swinging said first and second leg means into their respective second positions so that the front edge of said ramp means can move downwardly below said first and second levels as said first and second leg means are respectively swung into their second positions.

2. In a dock leveler according to claim 1, wherein said ramp means includes a stop member rigidly secured thereto adjacent the front edge thereof, said stop member extending downwardly from said ramp means and being engageable with said abutment means when said first and second leg means are in their second positions for supporting the front edge of said ramp means at a third level which is below said second level.

3. In a dock leveler according to claim 2, wherein said ramp means includes a main platelike deck, said stop member comprising a front plate fixed to said deck adjacent the front edge thereof and projecting downwardly therefrom, the lowermost edge of said front plate being adapted to engage said abutment means when said ramp means is in said third level, said first and second leg means being swingable about substantially horizontal axes which extend substantially parallel to the front edge of said deck, and said first and second leg means being urged solely by gravity toward and into their respective first positions so that said leg means bear against said front plate when the ramp means is in or near said first level.

4. In a dock leveler according to claim 3, wherein said first and second leg means respectively comprise first and second elongated leg members each being of a channel-shaped configuration, said first and second leg members having their upper end portions hingedly connected to said ramp means about a common horizontal axis which extends substantially parallel to the front edge of said ramp means, said first and second leg members being nested one within the other when said leg members are in their respective first positions, said first leg member being longer than said second leg member so that the lower end of said first leg member is spaced downwardly from the lower end of said second leg member, whereby the lower end of said first leg member engages said abutment means when said ramp means is at said first level and whereby the lower end of said second leg member engages said abutment means when said ramp means is at said second level.

5. In a dock leveler according to claim 1, wherein said abutment means includes an upwardly directed abutment surface thereon, wherein said first leg means has a first downwardly directed stop surface on the lower end thereof, wherein said leg means has a second downwardly directed stop surface on the lower end thereof, each of said first and second stop surfaces being adapted for engagement with said abutment surface, and said first stop surface being spaced downwardly a substantial distance below said second stop surface so that said first stop surface engages said abutment surface when said ramp means is at said first level, said second stop surface being spaced upwardly from said abutment surface when the ramp means is at said first level, and said second stop surface engaging said abutment surface when the front edge of said ramp means is at said second level.

6. In a dock leveler according to claim 1, wherein said first and second leg means are nested one within the other but are independently and individually swingable relative to one another through at least a limited angular extent.

7. In a dock leveler according to claim 6, wherein each of said first and second elongated leg means are of a channel-shaped cross section so that the first and second leg means can at least partially nest one within the other.

8. In a dockboard assembly including support means, ramp means hingedly mounted on said support means for swinging movement about a substantially horizontal hinge axis, said ramp means having the front portion thereof adapted for coaction with a carrier for permitting the loading or unloading of the carrier, the combination comprising:

safety stop means coacting between said support means and said ramp means for preventing downward pivotal movement of said ramp means from a plurality of predetermined levels, said stop means including abutment means fixedly associated with said support means and disposed below the front portion of said ramp means;

said stop means further including a first elongated leg member pivotally supported upon said ramp means beneath and near the front edge portion of said ramp means for swinging movement about a horizontal axis between a first position engageable with said abutment means, whereby the front edge of said ramp means is supported at a first level, and a second position spaced laterally from said abutment means;

said stop means also including a second elongated leg member pivotally supported on said ramp means beneath and near the front edge portion of said ramp means for swinging movement about a horizontal axis between a first position engageable with said abutment means, when said first leg member is in its second position, whereby the front edge of said ramp means is supported at a second level below said first level, and a second position spaced laterally from said abutment means;

said first and second leg members respectively comprising first and second elongated channel-shaped members disposed in nested relationship one within the other when said first and second leg members are disposed in their respective first positions, each of said first and second channel-shaped members being pivotally supported adjacent the upper end thereof, the lower end of said first channel-shaped member being spaced downwardly from the lower end of said second channel-shaped member, and the lower end of said first and second members being engageable with said abutment means for defining said first and second levels, respectively; and actuating means connected to said first and second leg members and operable for swinging said first and second leg members selectively and individually into their second positions so that the front edge of said ramp means can move downwardly below said second level.

9. In a dockboard assembly according to claim 8, wherein said first and second channel-shaped members are pivotally connected to said ramp means about a common horizontal axis which extends substantially parallel to said hinge axis.

10. In a dockboard assembly according to claim 8, wherein said ramp means includes a substantially planar deck, the hinge axis for said ramp means being positioned adjacent the rear edge of said deck, said first and second leg members being pivotally connected to said deck adjacent the front edge thereof, said ramp means also including a front plate fixedly connected to said deck adjacent the front edge thereof and projecting downwardly therefrom, the lower edge of said front plate being adapted to engage said abutment means for supporting said ramp means at a third level which is spaced downwardly from said second level when said first and second leg members are respectively in their second positions.

11. In a dockboard assembly according to claim 10, wherein a pair of nested first and second leg members are pivotally mounted on said deck adjacent each front corner thereof, said pair of leg members being normally urged about the pivot axis so as to engage said front plate.

* * * * *